US012755625B2

(12) United States Patent
Yuan et al.

(10) Patent No.: US 12,755,625 B2
(45) Date of Patent: Oct. 6, 2026

(54) VOICE-TRIGGERED INTELLIGENT SAFETY DEVICE/SYSTEM

(71) Applicant: HITACHI, Ltd., Tokyo (JP)

(72) Inventors: Wei Yuan, Novi, MI (US); Jie Hu, Northville, MI (US); Quan Zhou, Novi, MI (US)

(73) Assignee: HITACHI, LTD., Tokyo (JP)

( * ) Notice: Subject to any disclaimer, the term of this patent is extended or adjusted under 35 U.S.C. 154(b) by 25 days.

(21) Appl. No.: 18/892,096

(22) Filed: Sep. 20, 2024

(65) Prior Publication Data

US 2026/0087923 A1 Mar. 26, 2026

(51) Int. Cl.
*G08B 21/18* (2006.01)
*G10L 15/08* (2006.01)
(Continued)

(52) U.S. Cl.
CPC .............. *G08B 21/18* (2013.01); *G10L 15/08* (2013.01); *G10L 25/30* (2013.01); *G10L 25/63* (2013.01); *G10L 2015/088* (2013.01)

(58) Field of Classification Search
CPC ......... G10L 15/22; G10L 15/26; G10L 15/14; G10L 15/16; G10L 15/1815; G10L 15/1822; G10L 15/19; G10L 15/02; G10L 15/063; G10L 15/083; G10L 17/00; G10L 17/02; G10L 17/08; G10L 2015/223; G10L 13/00; G10L 13/02; G10L 15/01;
(Continued)

(56) References Cited

U.S. PATENT DOCUMENTS

2008/0278007 A1* 11/2008 Moore .................... G10L 15/26
704/E15.045
2009/0204310 A1* 8/2009 Gittere ................... G07C 5/008
701/101
(Continued)

FOREIGN PATENT DOCUMENTS

| | | | |
|---|---|---|---|
| EP | 3621069 | A1 | 3/2020 |
| WO | 2004048844 | A1 | 6/2004 |
| WO | 2009155948 | A1 | 12/2009 |

OTHER PUBLICATIONS

"An Intelligent Audio Wearable Platform for Construction Worker Safety in Urban Environments", retrieved Sep. 18, 2024, 2 pages https://www.youtube.com/watch?v=Br3zWFyAwJ0.
(Continued)

*Primary Examiner* — Daniel Previl
(74) *Attorney, Agent, or Firm* — PROCOPIO, CORY, HARGREAVES & SAVITCH LLP

(57) ABSTRACT

Systems and method for a manufacturing environment, including storing collected sound data from at least one sound collection device; converting the stored collected sound data from analog sound data to digital sound data; extracting human sound data from the digital sound data; extracting environmental sound data from the digital sound data; executing word detection on the human sound data; executing emotion analysis from the extracted human sound data; and for analysis of the word detection and the emotion analysis indicative of an emergency: controlling one or more associated machines in the manufacturing environment in response to the emergency, wherein a location of the one or more associated machines is derived from the environmental sound data.

20 Claims, 14 Drawing Sheets

The proposed workflow to detect an emergency based on sounds

(51) Int. Cl.
*G10L 25/30* (2013.01)
*G10L 25/63* (2013.01)

(58) Field of Classification Search
CPC ....... G10L 15/05; G10L 15/18; G10L 15/193; G10L 15/30; G10L 2025/783; G10L 21/0272; G10L 25/18; G10L 25/78; G10L 25/87; G10L 15/005; G10L 15/08; G10L 15/187; G10L 15/32; G10L 17/24; G10L 19/008; G10L 21/0308; G10L 25/30; G10L 25/48; G10L 25/63; G10L 15/00; G10L 15/04; G10L 17/26; G10L 19/0017; G10L 19/02; G10L 2015/025; G10L 2015/0635; G10L 2021/02087; G10L 21/02; G10L 21/04; G10L 25/03; G10L 25/51; G06Q 30/0261; G06Q 30/0269; G06Q 30/012; G06Q 10/06393; G06Q 30/0201; G06Q 30/0251; G06Q 30/0282; G06Q 10/00; G06Q 20/00; G06Q 30/00; G06Q 40/00; G06Q 50/00; G06Q 90/00; G06Q 99/00; G06Q 2220/00; G06Q 2230/00; G06Q 2240/00; G06Q 2250/00; H04M 2201/40; H04M 3/2281; H04M 3/42102; H04M 3/4878; H04M 1/6025; H04M 11/06; H04M 11/066; H04M 3/56; H04M 3/567; H04M 3/568; H04M 7/0057; H04W 4/02; H04W 4/12; H04W 12/02; H04W 12/037; H04W 4/026; H04W 4/027; H04W 4/40; H04W 4/46; H04W 52/04; H04W 72/20; H04W 72/30; H04W 76/14; H04W 76/40; H04W 4/00; H04W 8/00; H04W 12/00; H04W 16/00; H04W 24/00; H04W 28/00; H04W 36/00; H04W 40/00; H04W 48/00; H04W 52/00; H04W 56/00; H04W 60/00; H04W 64/00; H04W 68/00; H04W 72/00; H04W 74/00; H04W 76/00; H04W 80/00; H04W 84/00; H04W 88/00; H04W 92/00; H04W 99/00; A61B 5/378; A61B 5/316; A61B 5/374; A61B 5/38; A61B 5/381; A61B 5/7246; A61B 5/372; A61B 6/4258; A61B 5/0816; A61B 5/4824; A61B 5/681; A61B 5/0823; A61B 5/1118; A61B 5/4803; A61B 5/6892; A61B 5/7275; A61B 5/746; A61B 2560/0242; A61B 2562/0204; A61B 5/0022; A61B 5/0077; A61B 5/02055; A61B 5/021; A61B 5/024; A61B 5/02405; A61B 5/029; A61B 5/082; A61B 5/14542; A61B 5/318; A61B 5/4011; A61B 5/4017; A61B 5/444; A61B 5/4812; A61B 5/4836; A61B 5/7267; A61B 5/7415; A61B 5/742; A61B 7/003; A61B 7/04; A61B 2560/0214; A61B 2560/0252; A61B 2562/0247; A61B 2562/029; A61B 5/0002; A61B 5/0006; A61B 5/0008; A61B 5/002; A61B 5/01; A61B 5/02444; A61B 5/08; A61B 5/1102; A61B 5/1115; A61B 5/113; A61B 5/291; A61B 5/377; A61B 5/4064; A61B 5/4818; A61B 5/4848; A61B 5/6803; A61B 5/7203; A61B 5/721; A61B 5/7225; A61B 5/7282; G06N 3/10; G06N 3/08; G06N 3/02; G06N 3/04; G06N 3/042; G06N 3/082; G06N 3/048; G06N 5/04; G06N 20/00; G06N 3/045; G06N 3/0464; G06N 3/084; G06N 3/004; G06N 3/0409; G06N 3/044; G06N 3/0442; G06N 3/0455; G06N 3/0475; G06N 3/09; G06N 3/098; G06N 5/02; G06N 5/022; G06N 5/046; G06T 2207/10016; G06T 2210/36; G06T 3/40; G06T 3/4053; G06T 5/20; G06T 5/73; G06T 11/00; G06T 2207/10028; G06T 2207/20081; G06T 2207/30176; G06T 7/0006; G06T 19/006; G06T 19/20; G06T 2200/24; G06T 2207/30224; G06T 2207/30241; G06T 2207/30252; G06T 2210/62; G06T 2219/2004; G06T 5/50; G06T 5/60; G06T 5/70; G06T 7/20; G06T 7/246; G06T 7/248; G06T 7/277; G06T 7/60; G06T 7/73; B22C 9/04; B22C 9/10; B23P 15/246; B23P 33/301; B23P 33/38; B23P 33/3835; G08G 1/052; G08G 1/096791; G08G 1/00; G08G 3/00; G08G 5/00; G08G 7/00; G08G 9/00; G08G 99/00; H04L 67/12; H04L 1/00; H04L 5/00; H04L 7/00; H04L 9/00; H04L 12/00; H04L 13/00; H04L 15/00; H04L 19/00; H04L 17/00; H04L 21/00; H04L 25/00; H04L 23/00; H04L 27/00; H04L 41/00; H04L 43/00; H04L 45/00; H04L 47/00; H04L 49/00; H04L 51/00; H04L 61/00; H04L 63/00; H04L 65/00; H04L 67/00; H04L 69/00; H04L 2101/00; H04L 2203/00; H04L 2201/00; H04L 2209/00; H04L 2212/00; H04L 2463/00; G06F 16/9538; G06F 16/9577; G06F 1/00; G06F 3/00; G06F 5/00; G06F 7/00; G06F 8/00; G06F 9/00; G06F 11/00; G06F 12/00; G06F 13/00; G06F 15/00; G06F 16/00
USPC ...... 340/540, 539.11, 539.13, 539.22, 568.1, 340/573.4, 679–680, 3.1, 825.23
See application file for complete search history.

(56) References Cited

U.S. PATENT DOCUMENTS

| | | | | |
|---|---|---|---|---|
| 2011/0226116 | A1* | 9/2011 | Dejima ................ | G10H 1/0025<br>84/604 |
| 2016/0358312 | A1* | 12/2016 | Kolb, V .................... | G06T 5/73 |
| 2019/0206223 | A1* | 7/2019 | Hwang .................. | G08B 25/08 |
| 2021/0226116 | A1* | 7/2021 | Grosso ................... | H10N 30/04 |
| 2021/0401364 | A1* | 12/2021 | Moussavi .............. | G16H 50/70 |

OTHER PUBLICATIONS

Extended European Search Report Issued in EP Patent Application No. 25181633.6, dated Sep. 10, 2025, 8 pages.

* cited by examiner

VOICE-TRIGGERED INTELLIGENT SAFETY DEVICE/SYSTEM

BACKGROUND

Field

The present disclosure is generally directed to safety systems for industrial environments, and more specifically, to intelligent voice-triggered safety systems.

Related Art

Injury to humans in the working environment has been a common problem. According to Bureau of Labor Statistics from U.S. Department of Labor, there were about 5000 fatal work injuries recorded every year in the U.S. in the past decades. A significant number of injuries (over 500) happen due to contact between human and machine moving parts. During this time, it becomes difficult to stop the machine using the emergency stop button or even just call for help. This can arise due to the inability of the injured person to reach the safety emergency stop button, unconsciousness, or any other unprecedented situation. According to National Safety Council, the total cost of work injuries in 2021 was $167.0 billion, and the cost per death was $1.3 million.

SUMMARY

In the event of an emergency that involves humans and moving machine parts, it is likely that the physical emergency button is out of reach. Example implementations described herein involve a safety system that can be triggered by voice to identify and shut down the involved machines to prevent further injuries. Specifically, there are three issues in the related art to be addressed by the example implementations described herein.

There is a need to stop a machine without physical manipulation/manual operation. There is also a need to identify and confirm real emergencies through voice and sound inputs from microphones in potentially noisy environments. There is also a need to locate and identify the source of the emergency. For example, there is a need to determine which equipment to stop and shut down when there are more than one equipment in a factory or warehouse environment.

Example implementations described herein can involve a system that can detect emergencies in various manufacturing environments, the system involving: at least one sound collection device; at least one memory to store the collected sounds data; at least one device to convert the sounds data from analog signals to digital signals; at least one memory comprising executable actions by the processor to process the collected sounds data, including: extract human sound data from the collected data; extract environmental sound from the collected data; generate timestamped sound data based on data collection time; detect the existence of certain words in the human sound data. One such implementation would be training a neural network using labeled human sound data; analyze the emotions from the collected sounds and confirm if emotions related to emergencies exist, such as fear, panic, anxiety, etc. determine if emergencies exist by using the analysis from keywords detection, emotion analysis, and so on, send signals to control the affected machines according to a predefined emergency mitigation plan, such as stop or slow down the machine(s), set off the alarms, and so on.

Example implementations can further involve instructions to identify the worker, including: generate a profile by using the collected human sound data, the profile can serve as the “voice print”; identify a group of workers that are currently working in a certain area based on the work schedule; compare the generate profile with a database that includes the profiles of a group of workers; calculate the confidence of the worker profile identification.

Example implementations can further involve instructions to identify the source of the sound, the affected machines, the locations of the affected machines and the worker(s) in danger. One such implementation is to compare the intensities of the sounds that are collected by multiple machines.

Aspects of the present disclosure can include a system for a manufacturing environment, which can include at least one sound collection device; a memory, configured to store collected sound data from the at least one sound collection device; an analog to digital converter configured to convert the stored collected sound data from analog sound data to digital sound data; and a processor, configured to extract human sound data from the digital sound data; extract environmental sound data from the digital sound data; execute word detection on the human sound data; execute emotion analysis from the extracted human sound data; and for analysis of the word detection and the emotion analysis indicative of an emergency, control one or more associated machines in the manufacturing environment in response to the emergency, wherein a location of the one or more associated machines is derived from the environmental sound data.

Aspects of the present disclosure can include a method for a manufacturing environment, which can involve storing collected sound data from at least one sound collection device; converting the stored collected sound data from analog sound data to digital sound data; extracting human sound data from the digital sound data; extracting environmental sound data from the digital sound data; executing word detection on the human sound data; executing emotion analysis from the extracted human sound data; and for analysis of the word detection and the emotion analysis indicative of an emergency, controlling one or more associated machines in the manufacturing environment in response to the emergency, wherein a location of the one or more associated machines is derived from the environmental sound data.

Aspects of the present disclosure can include a computer program, storing instructions for a manufacturing environment, which can involve storing collected sound data from at least one sound collection device; converting the stored collected sound data from analog sound data to digital sound data; extracting human sound data from the digital sound data; extracting environmental sound data from the digital sound data; executing word detection on the human sound data; executing emotion analysis from the extracted human sound data; and for analysis of the word detection and the emotion analysis indicative of an emergency, controlling one or more associated machines in the manufacturing environment in response to the emergency, wherein a location of the one or more associated machines is derived from the environmental sound data. The computer program and instructions can be stored on a non-transitory computer readable medium and executed by one or more processors.

Aspects of the present disclosure can include a system for a manufacturing environment, which can involve means for storing collected sound data from at least one sound collection device; means for converting the stored collected sound data from analog sound data to digital sound data; means for extracting human sound data from the digital sound data; means for extracting environmental sound data from the digital sound data; means for executing word detection on the human sound data; means for executing emotion analysis from the extracted human sound data; and for analysis of the word detection and the emotion analysis indicative of an emergency, means for controlling one or more associated machines in the manufacturing environment in response to the emergency, wherein a location of the one or more associated machines is derived from the environmental sound data.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

DETAILED DESCRIPTION

Figure 1:
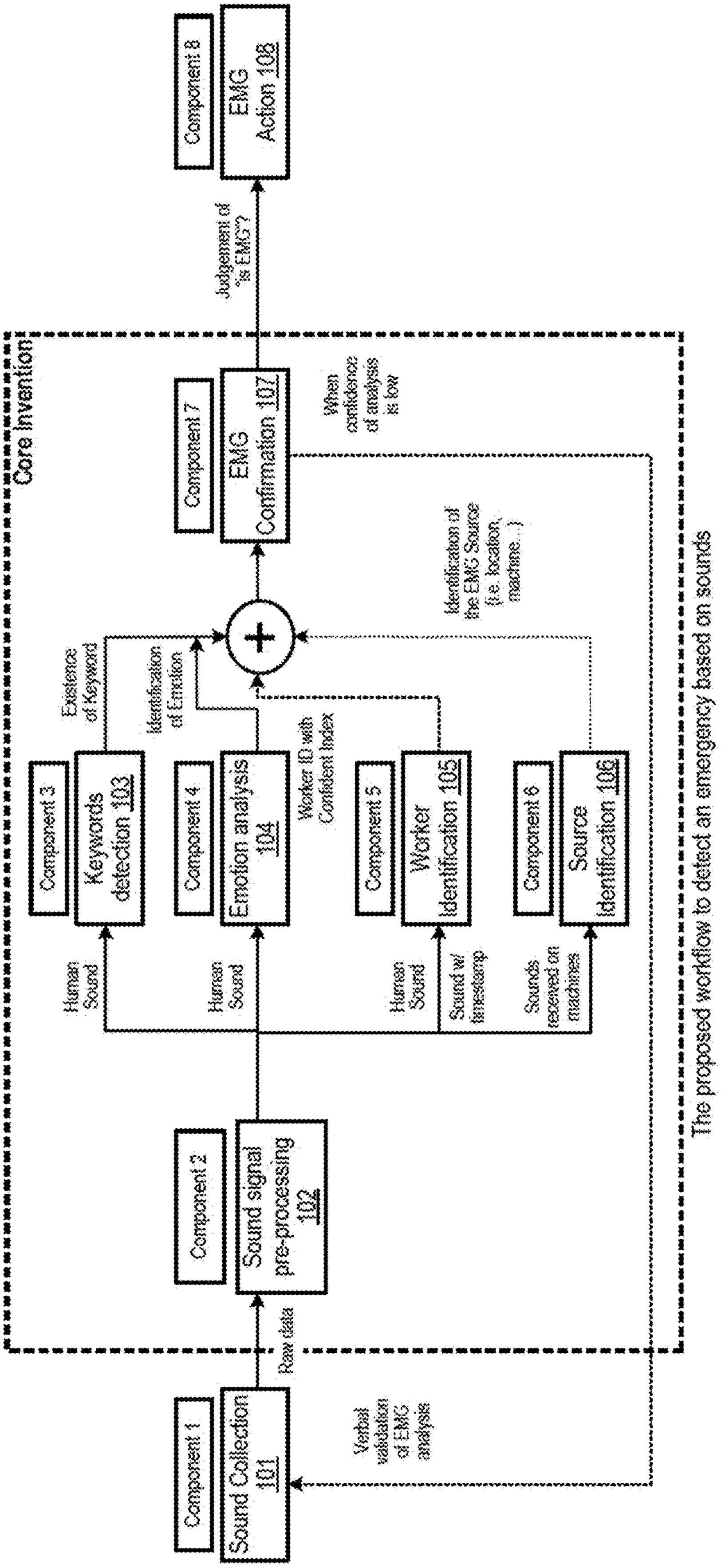
FIG. 1 illustrates the overall workflow for sound-based emergency detection, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means or can be implemented through a desired algorithm. Example implementations as described herein can be utilized either singularly or in combination and the functionality of the example implementations can be implemented through any means according to the desired implementations.

FIG. 1 illustrates the overall workflow for sound-based emergency detection, in accordance with an example implementation. The example implementations described herein can involve eight components as illustrated in FIG. 1. The first component is a sound collection component 101, which is described in more detail with respect to FIG. 2. The second component is a sound signal preprocessing component 102, which is described in more detail in FIG. 3. The third component is a keywords detection component 103, which is described in more detail in FIG. 4. The fourth component is an emotion analysis component 104, which is described in more detail in FIG. 5. The fifth component is a worker identification component 105 which is described in more detail in FIG. 6. The sixth component is a source identification component 106, which is described in more detail in FIG. 7. The seventh component is an emergency confirmation component 107, which is described in more detail in FIG. 8. The eighth component is an emergency action taking component 108 which is described in more detail in FIG. 9.

Figure 2:
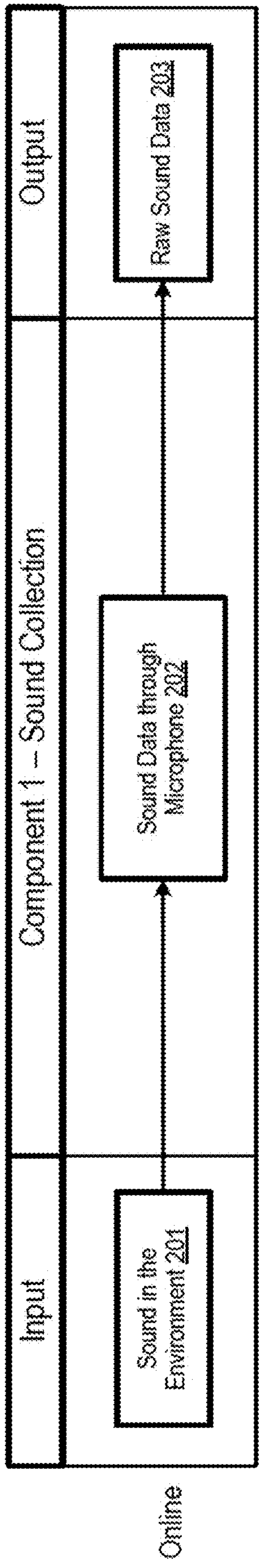
FIG. 2 illustrates the sound collection component, in accordance with an example implementation.

FIG. 2 illustrates the sound collection component 101, in accordance with an example implementation. The sound collection component collects the sounds in the environment 201 using microphones for a preset time. The microphones for collecting sounds 202 can be attached to the machines or adjacent to the machines or integrated on wearable devices, in accordance with the desired implementation. The recorded raw sound data 203 is saved for further analysis.

Figure 3:
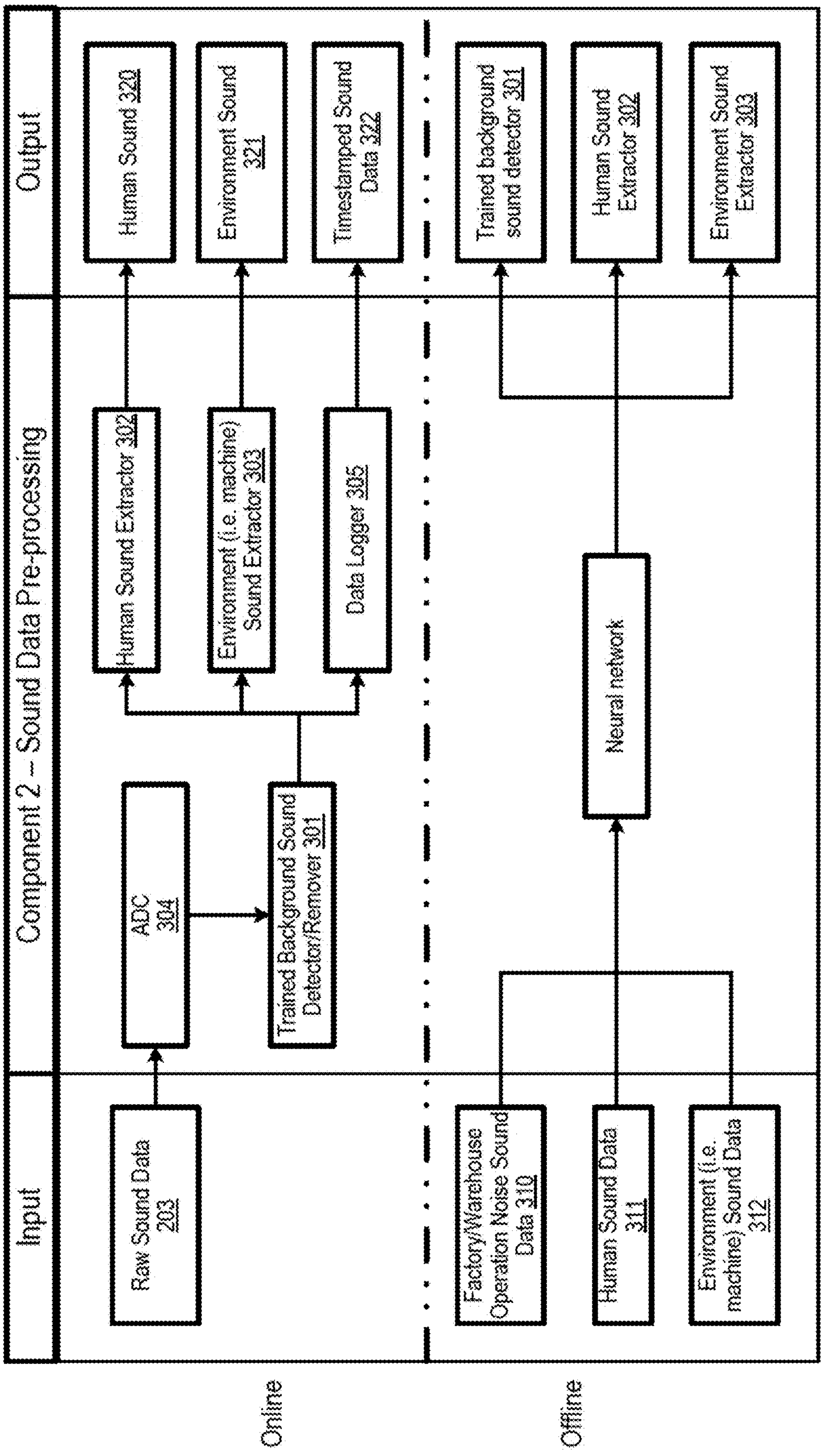
FIG. 3 illustrates the component for sound signal preprocessing, in accordance with an example implementation.

FIG. 3 illustrates the component for sound signal preprocessing 102, in accordance with an example implementation. This component includes three offline trained neural networks for detecting background sound 301, human sound 302, and the environment sound 303, respectively. The trained background sound detector 301 detects the factory/warehouse operation noises 310. The environmental sound extractor 303 detects the sounds from the environment 312, such as machines or other environmental sounds. The human sound extractor 302 detects and extracts human sound data 311 from the raw sound data 203.

In the example implementations, after receiving the raw sound data 203 from the flow of FIG. 2, the sound data is first converted into digital signals using an Analog to Digital Convertor (ADC) 304. Then, the background sound is removed/filtered by the trained background sound detector 301 so that the remaining digital signals can be processed by the human sound extractor 302 and the environment sound extractor 303, as well as a data logger 305. The converted and filtered digital signals are separated into human sound 320, environmental sound 321, and timestamped sound data 322.

Figure 4:
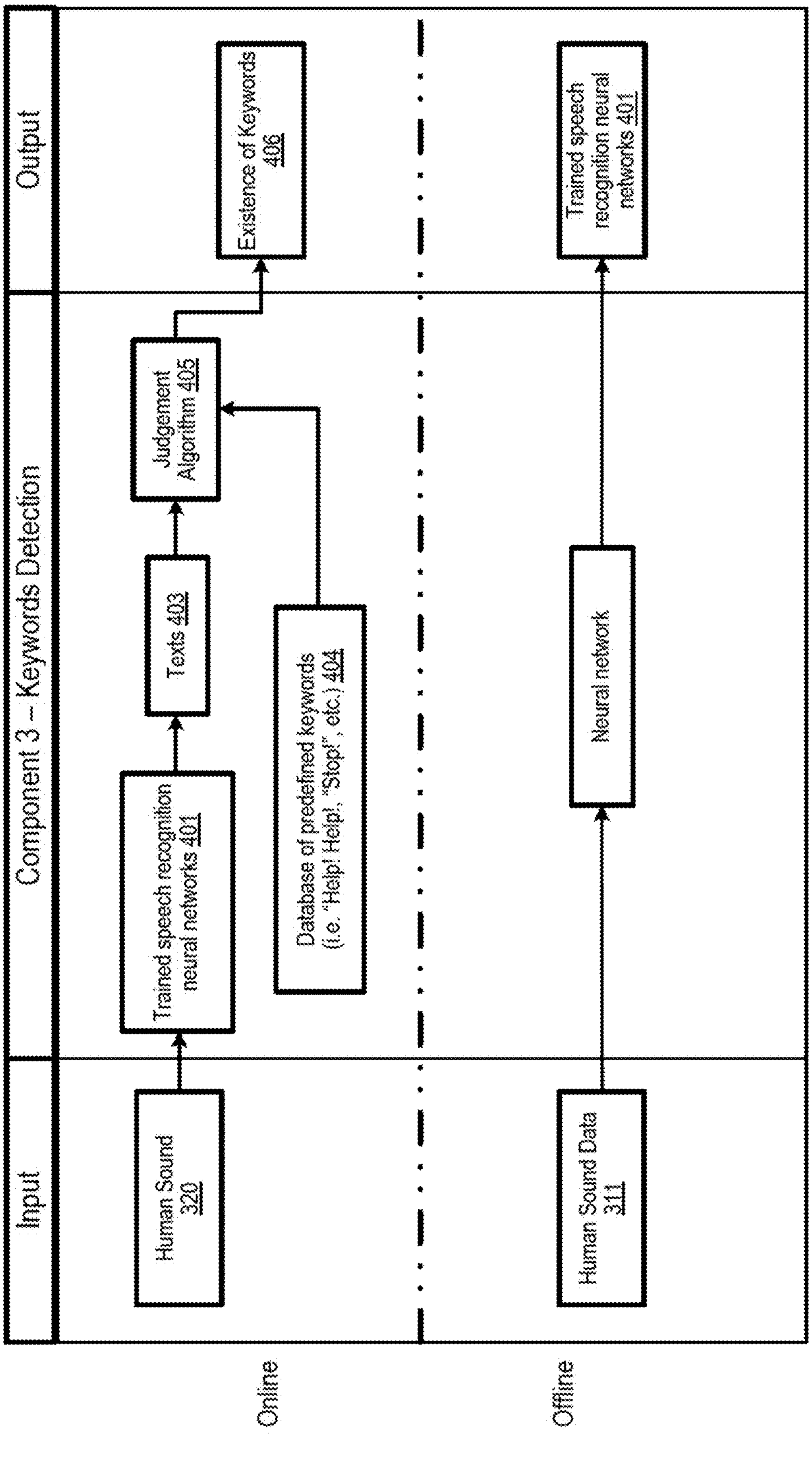
FIG. 4 illustrates the component for keywords detection, in accordance with an example implementation.

FIG. 4 illustrates the component for keywords detection 103, in accordance with an example implementation. This component has a neural network which is trained offline by using human sound data 311. After receiving the extracted human sound data 320 from the human sound extractor 302, the trained neural network translates the audio into texts 403. The texts 403 are checked for a predefined set of keywords 404, such as "Help! Help!", "Stop!", and so on depending on the desired implementation. The output of this component is whether one or more of the keywords exist in the sound data. The existence of keywords 406 is generated based on a decision from a judgement algorithm 405.

Figure 5:
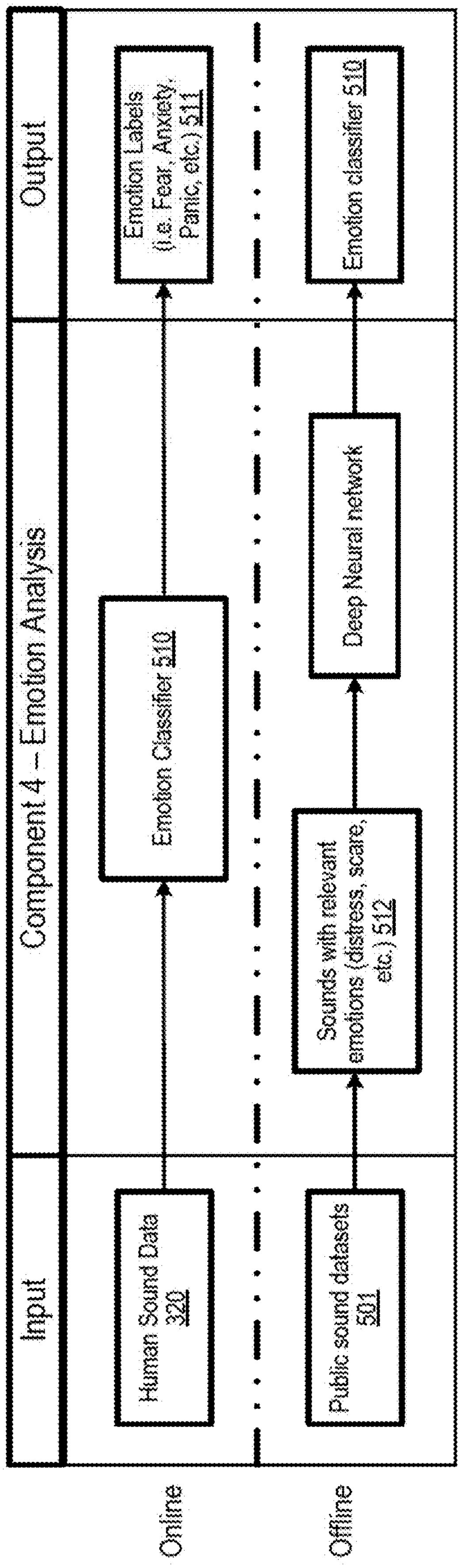
FIG. 5 illustrates the component for emotion analysis, in accordance with an example implementation.

FIG. 5 illustrates the component for emotion analysis 104, in accordance with an example implementation. The purpose of this component is to detect the emotions associated with emergencies, such as fear, anxiety, panic, and so on. The component includes a neural network that is trained offline by using labeled human sound data from public datasets 501 to formed trained speech recognition neural networks. Each sound data is labeled with the emotion(s) associated with the audio snippet at 512, which is then used to train deep neural networks to form emotion classifiers 510. After receiving the human sound data 320 from the human sound extractor 302, the trained emotion classifier 510 would output the type of emotion(s) 511 expressed in the sound.

Figure 6:
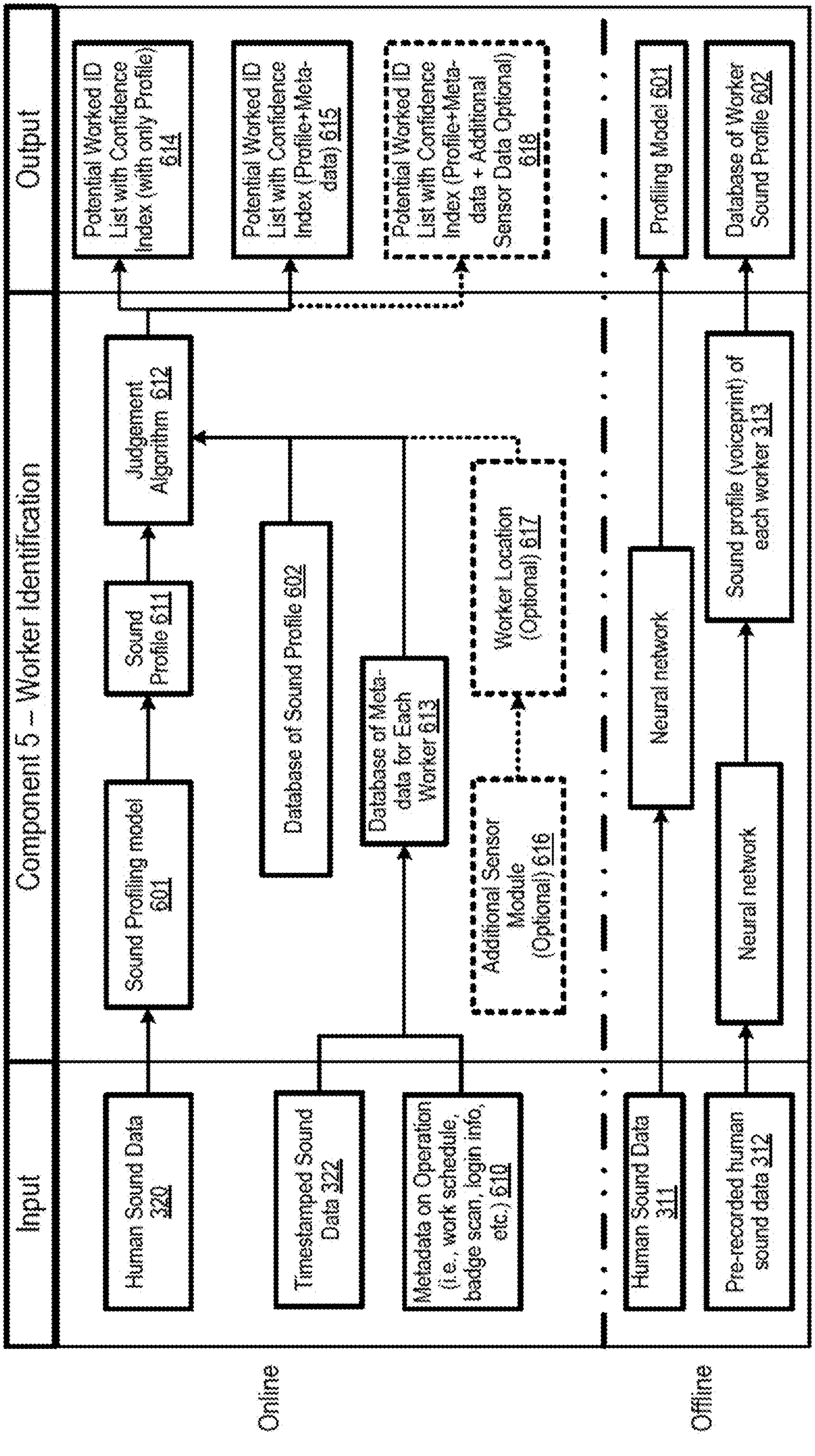
FIG. 6 illustrates the component for worker identification, in accordance with an example implementation.

FIG. 6 illustrates the component for worker identification 105, in accordance with an example implementation. Two sets of information are prepared offline: the profiling model 601 and the database of worker sound profile 602. The profiling model 601 is a neural network trained using human sound data 311. The database of worker sound profile 602 includes the sound profiles of all the workers that can be used as unique identifications. Such a database can be constructed by a neural network which intakes pre-recorded human sound data 312 of workers to be identified, and outputs a corresponding sound profile/voiceprint of each worker 313.

After preprocessing, the extracted human sound data 320 is provided to the sound profiling model 601. The time-stamped sound data 322 along with metadata from operation 610, such as work schedule of the plant, badge scan information, login information, etc., are utilized to identify the candidates of workers and their unique sound profiles from referencing the database of metadata associated with each worker 613. The judgement algorithm 612 uses the generated sound profile 611, the candidate workers and their sound profiles from the database to calculate a list of workers with corresponding confidence 614, and a list of workers with confidence, profile, and metadata 615. Additionally, when other sensor modules 616 are available to obtain the worker locations 617, each identified worker is also associated with their physical location information as shown at 618.

Figure 7:
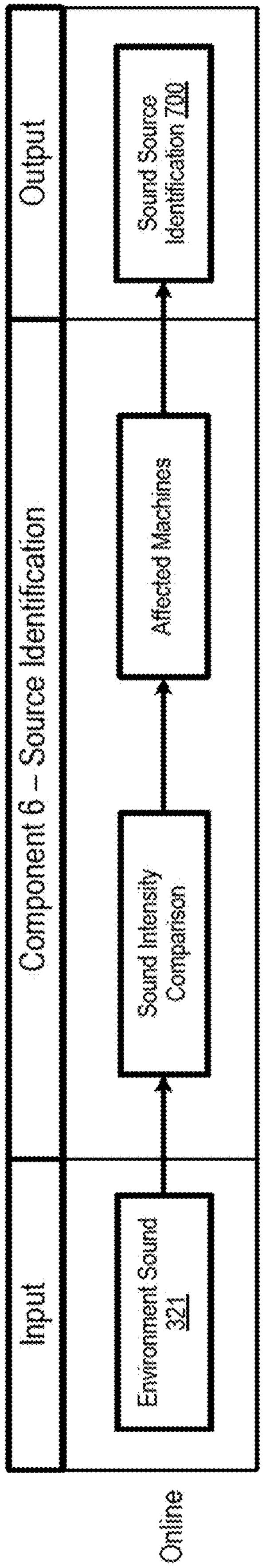
FIG. 7 illustrates the component for source identification, in accordance with an example implementation.

FIG. 7 illustrates the component for source identification 106, in accordance with an example implementation. This component is designed to identify the locations of the machines and the workers in emergency. The environmental sounds 321 received by the machines may have different intensities, which indicate the differences in the physical distances between the machines and the worker in emergency. Each machine that has received the sound is assigned a radius based on the sound intensity level. The intersection of the circles from the affected machines represents the location of the worker in danger. The sound source identification 700 and corresponding location can be provided accordingly.

Figure 8:
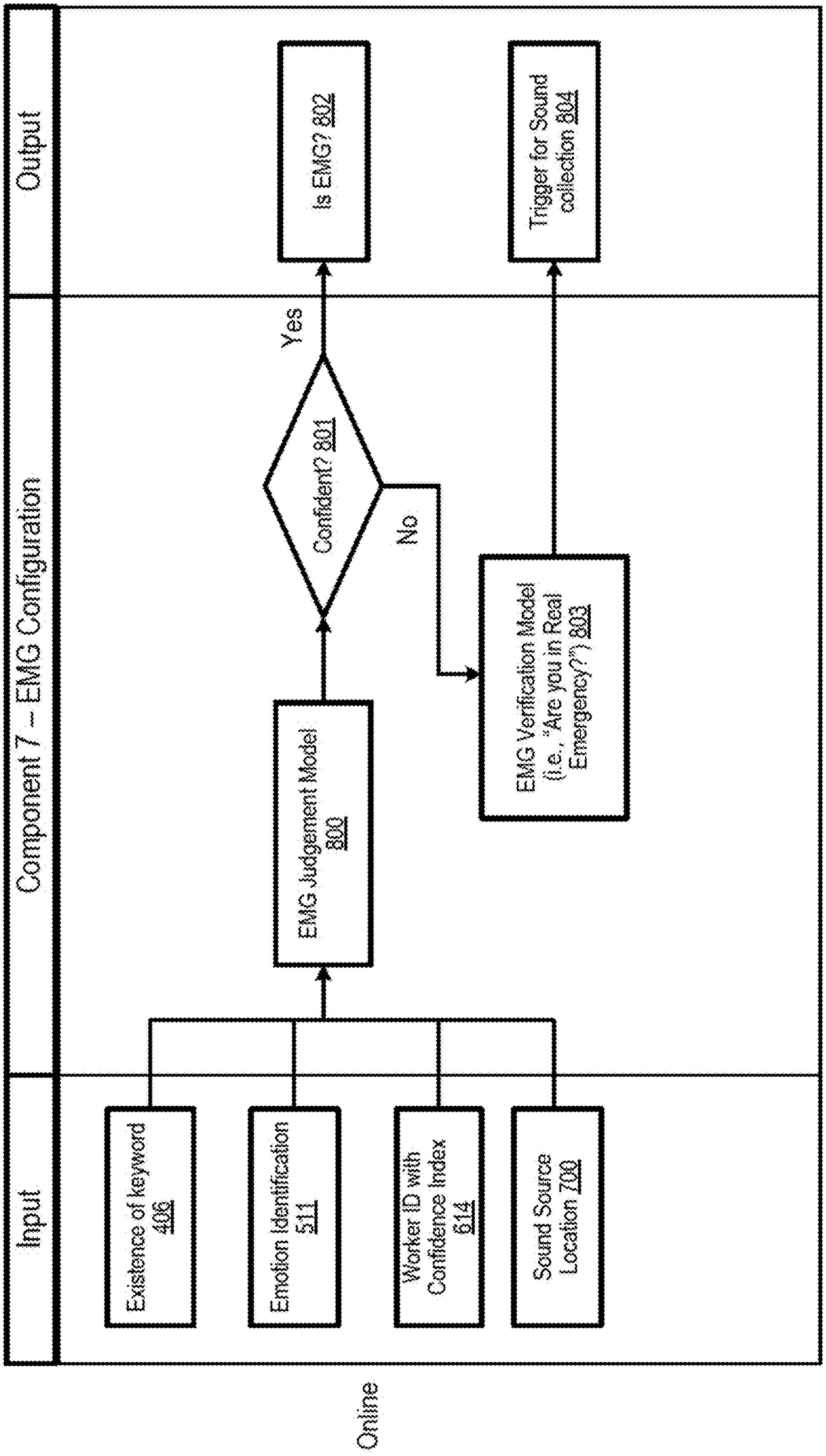
FIG. 8 illustrates the component for emergency confirmation, in accordance with an example implementation.

FIG. 8 illustrates the component for emergency confirmation 107, in accordance with an example implementation. The emergency (EMG) judgement model 800 utilizes the information from previous components, including the existence of one or more predefined keywords 406, the existence of emotions associated with emergencies 511, worker identifications with calculated confidences 614 (or 615, 616), and the sound source locations 700. The user can also customize the judgement module to emphasize different factors like emotion analysis, sound source location, and so on, in accordance with the desired implementation. For example, user can tune up the weight of emotion analysis for EMG judgement so that high levels of emotions (desperation/frustration) can directly be identified as EMG positive.

At 801, a confidence is determined for the judgment. When the component confident about the EMG judgement (Yes), the output 802 of this component is whether the recorded sound indicates an emergency. If an emergency is confirmed, the affected machine(s) and worker(s) information will be available for taking the appropriate actions. On the other hand, when the confidence in the EMG judgement is low (No), an EMG verification model 803 is executed to directly validate whether a real emergency scenario exists (i.e. by asking "Are you in a case of real emergency?") and simultaneously route responses back to trigger the sound collection 101 so that analysis can be run again.

Figure 9:
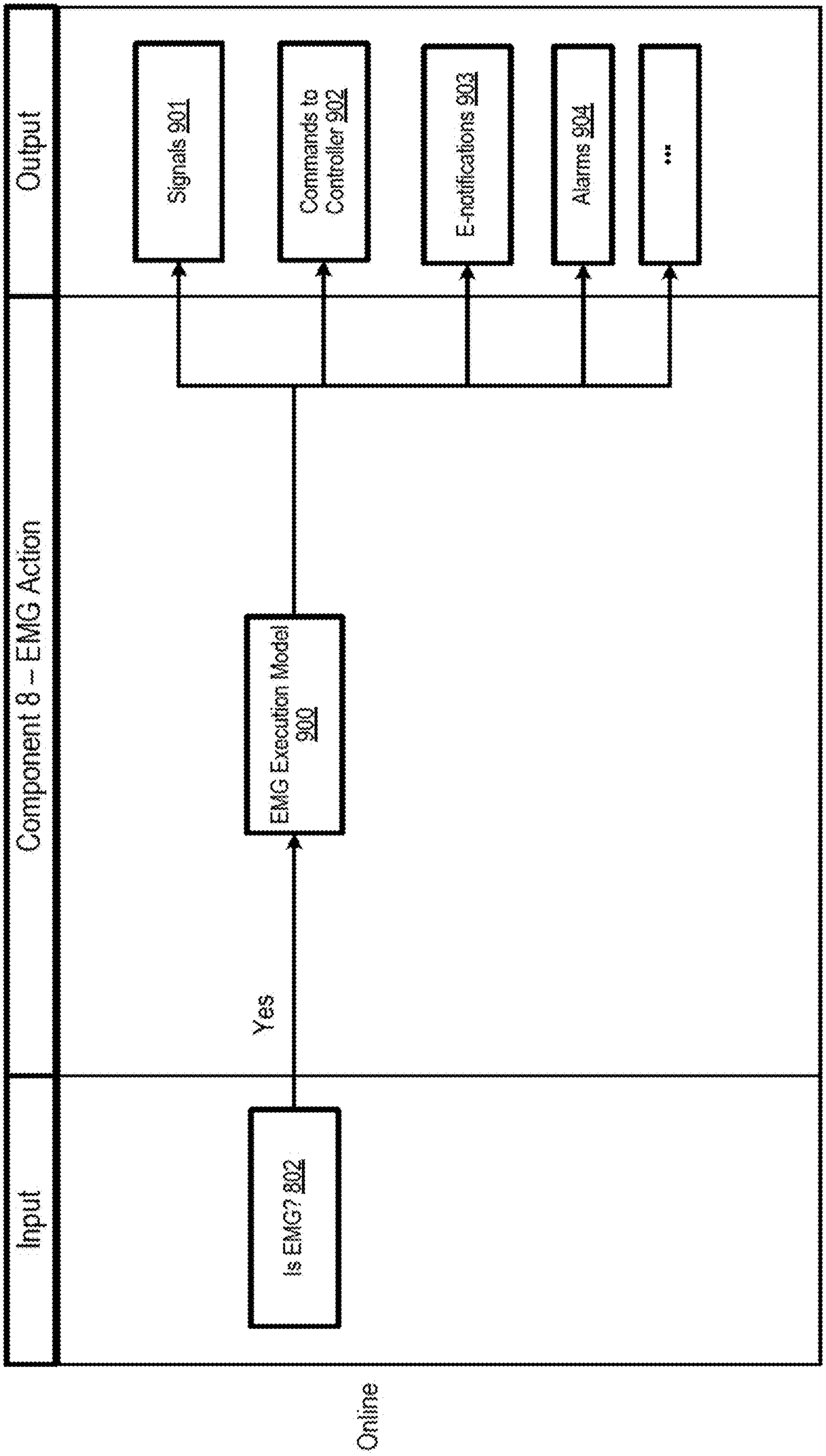
FIG. 9 illustrates the component corresponding to taking emergency actions, in accordance with an example implementation.

FIG. 9 illustrates the component corresponding to taking emergency actions 108, in accordance with an example implementation. After confirming an emergency is happening based on the sound data, several actions can be taken as determined by an EMG execution model 900, which can include transmitting signals 901, issuing commands to the controller 902 of affected machines, e-notifications 903, raising alarms 904, and so on. The user can also adjust the sensitivity to trigger the level of actions to be taken, such as, but not limited to, notification only, machine E-stop, power cut-off, and so on in accordance with the desired implementation. Typically, the affected machines can be shut down or slowed down by sending signals to the controllers of the machines; E-notifications can be sent to workers in the plant; alarms in affected areas can be set on, and so on.

Figure 10:
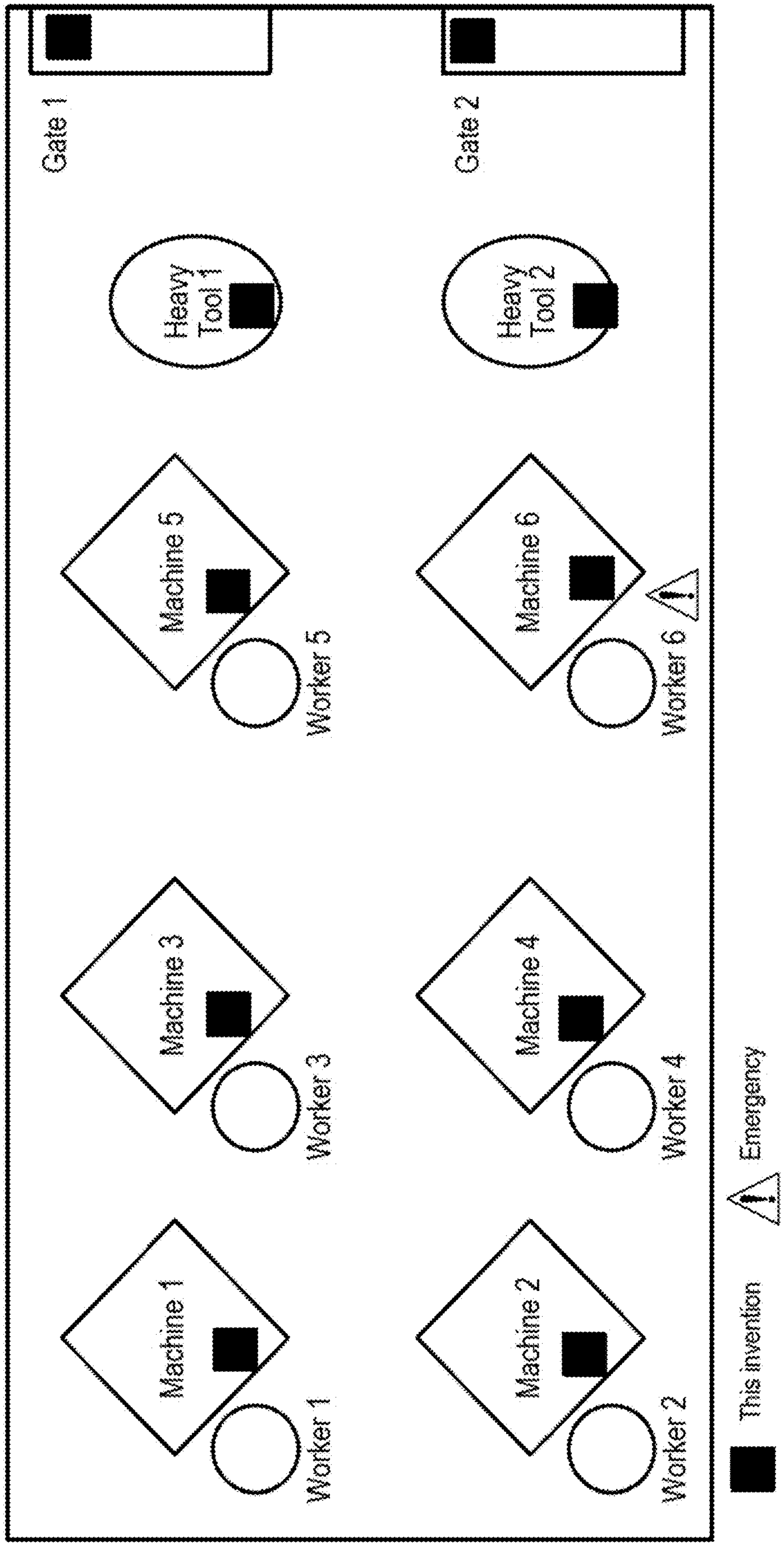
FIG. 10 illustrates a typical application when all machines and equipment in the shop are equipped in accordance with the example implementations described herein.

FIG. 10 illustrates a typical application when all machines and equipment in the shop are equipped in accordance with the example implementations described herein. Once emergency occurred at Machine 6 with Worker 6, the example implementations described herein will detect the worker asking for help and stop machine 6, notify workers around, sound the alarm for attention etc. to prevent further damage and also provide help. This can be applied to scenarios with Worker X and Machine Y once the machine is equipped with this invention.

Figure 11:
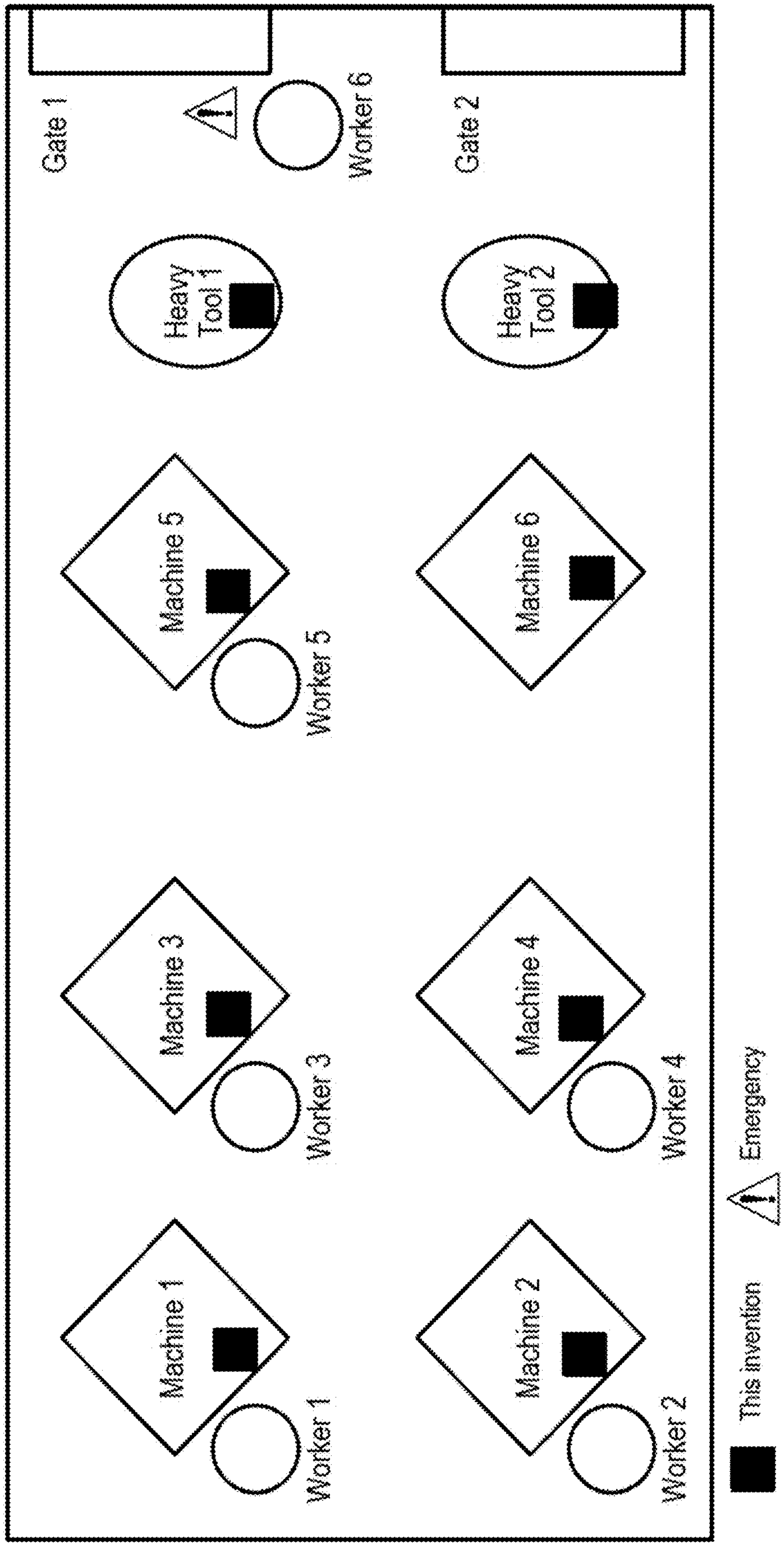
FIG. 11 illustrates the example case where not all machines or equipment have the example implementations implemented.

FIG. 11 illustrates the example case where not all machines or equipment have the example implementations implemented. In particular, all machines and heavy tools are equipped in accordance with the example implementations described herein, whereas the two gates are not equipped; however, the emergency happened with worker 6 or any worker at gate 1. In this case, the example implementations described herein will still pick up some distant signal and process the information to take action. However, since the gates are not managed by the example implementations described herein, the emergency action will be limited to sounding the alarm, notifying co-workers and supervisors, calling 911, and so on, instead of directly stopping the machine.

Figure 12:
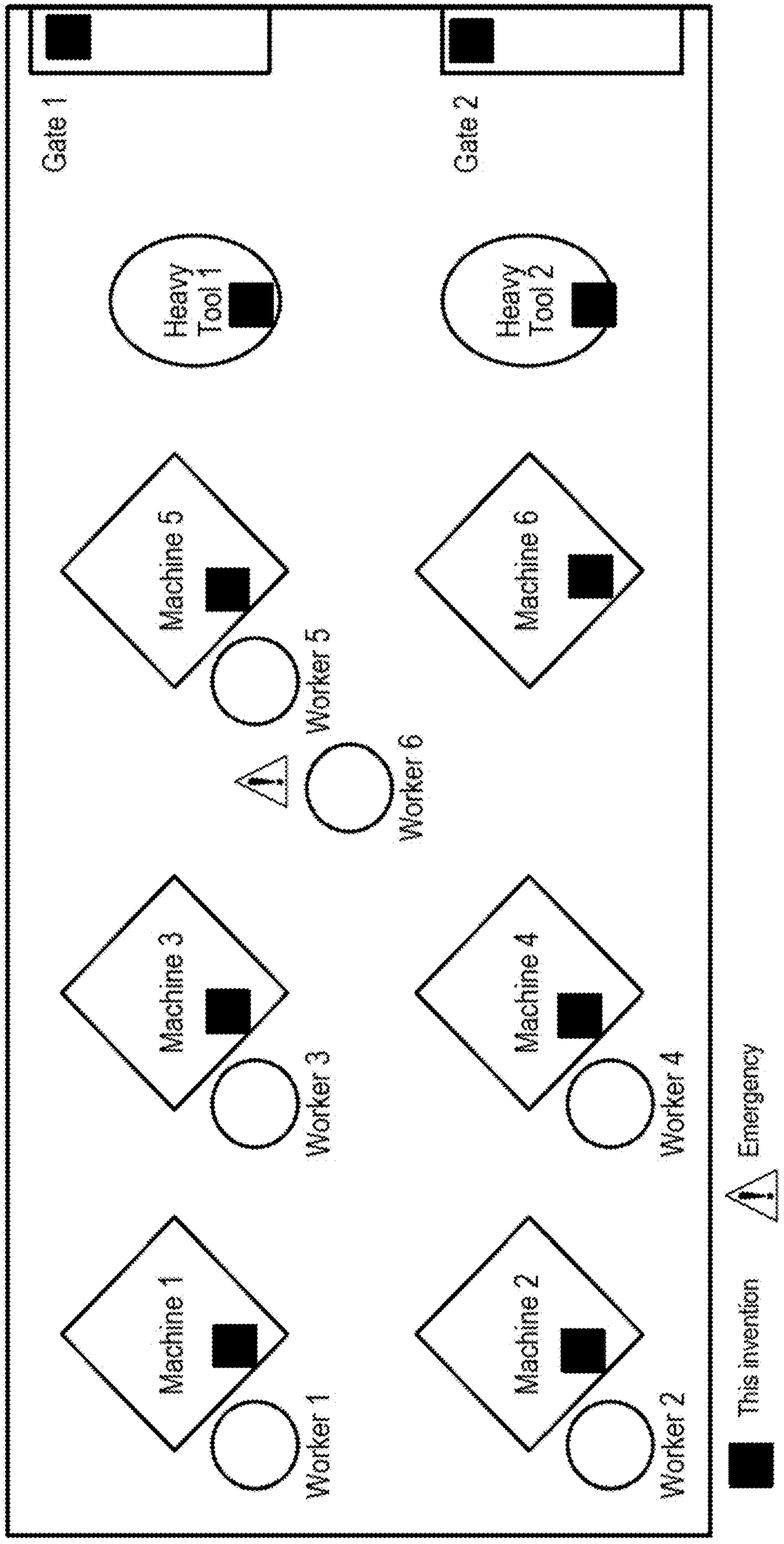
FIG. 12 illustrates the example case where emergency occurred when several devices detect similar strength of emergency signals at the same time.

FIG. 12 illustrates the example case where emergency occurred when several devices detect similar strength of emergency signals at the same time. In this case, the emergency happened with worker 6 at the location as shown, which is similar distance to all machines 3, 4, 5, and 6. In this case, users could tune the sensitivity level of emergency action and choose to stop all machines 3-6 and notify corresponding workers and supervisors. To the extreme, the user can choose to stop all machines when any emergency is detected.

Through the example implementations described herein, there can be a faster reaction to emergencies when workers cannot physically stop the machines causing danger; this can help manufacturers improve workspace safety and potentially save lives, reduce cost and productivity loss associated with worker injury or death.

The example implementations described herein can further use operation related information (worker schedule, worker profile etc.) to identify emergencies with high accuracy, as well as facilitate customizable emergency actions to protect workers.

Further, the example implementations described herein could potentially reduce premium related asset insurance for manufacturers as well as reduce expense for insurance companies to pay out to injuries or death.

Although example implementations described herein are directed to a use case in a manufacturing environment, the same system/solution can be applied to any other industry sectors and applications involving human and moving equipment or rotating machinery, such as conveyor systems, forklift, robot, AGV, crane in warehouse, automatic truck/ship/plane docking station, escalator and elevators in building, construction machines in the field and so on, in accordance with the desired implementation.

Figure 13:
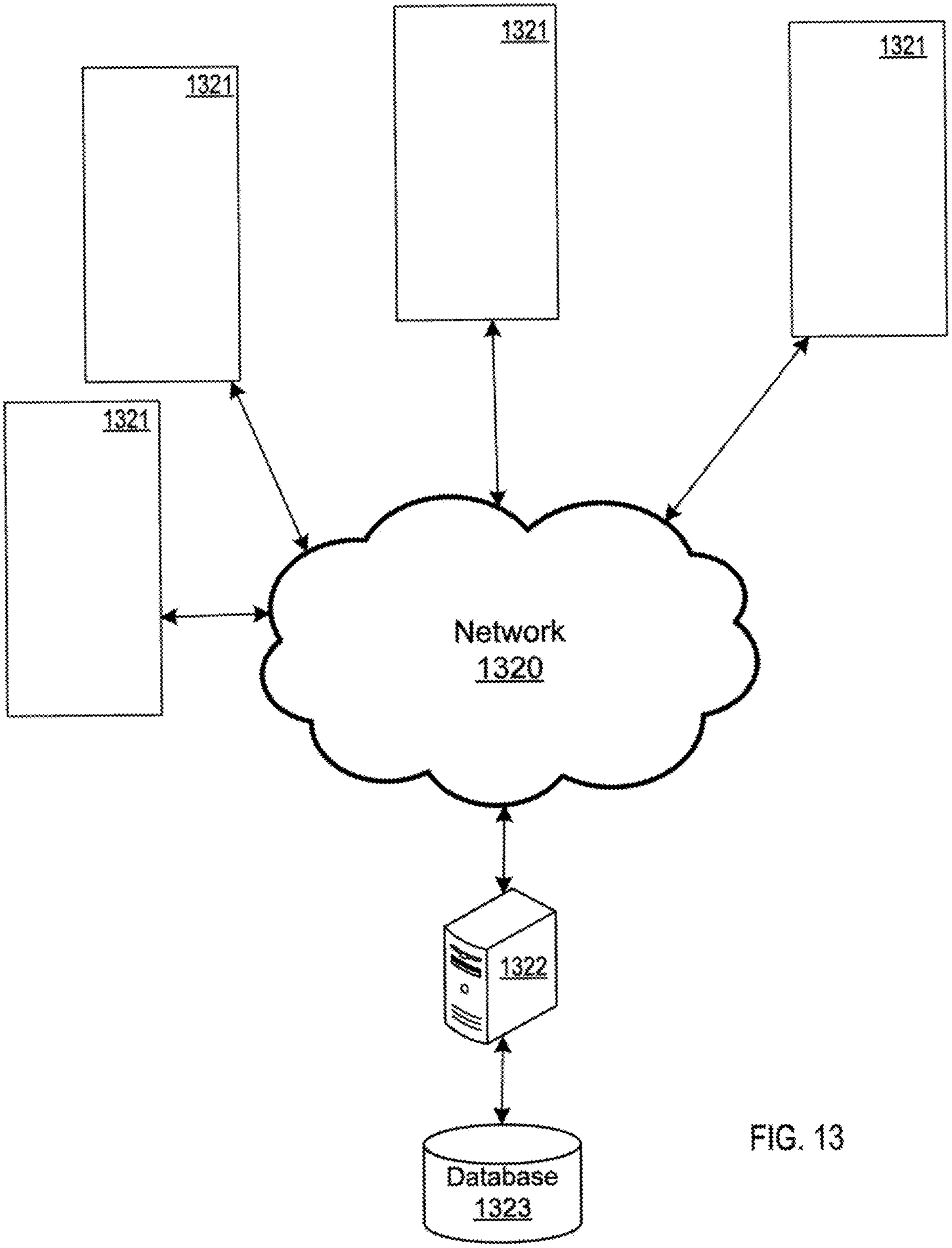
FIG. 13 illustrates a plurality of machines configured to operate in accordance to the example implementations described herein.

FIG. 13 illustrates a plurality of machines configured to operate in accordance to the example implementations described herein. One or more machines 1321 (e.g., conveyor belts, air compressors, lathes, forklifts, presses, etc.) are configured to execute their corresponding functions, which can be communicatively coupled to a network 1320 (e.g., local area network (LAN), wide area network (WAN)) through the corresponding network interface of the sensor system installed in the machines 1321, which is connected to a management apparatus 1322 configured to facilitate the functionality for the object recognition. The one or more machines 1321 may be associated with sensors or other data collecting mechanisms, depending on the desired implementation. The management apparatus 1322 manages a database 1323, which contains historical data collected from the sensor systems or data collecting mechanisms from each of the robots 1321. In alternate example implementations, the data from the sensor systems of the machines 1321 can be stored in a central repository or central database such as proprietary databases that intake data from the machines 1321, or systems such as enterprise resource planning systems, and the management apparatus 1322 can access or retrieve the data from the central repository or central database.

Management apparatus 1322 can also be configured to function either as a direct controller of the one or more machines 1321 to control operation of the one or more machines 1321, or can be configured to transmit instructions to local controllers of the one or more machines 1321 to control the one or more machines 1321 depending on the desired implementation.

The sensor systems of the machine 1321 can include any type of sensors to facilitate the desired implementation and provide internal status machine data, such as but not limited to gyroscopes, accelerometers, vision sensors (e.g., cameras, depth cameras, infrared sensors, and so on), global positioning satellite (GPS), thermometers, humidity gauges, or any sensors in accordance with the desired implementation. The management apparatus 1322 can also be connected to one or more sounding devices (not illustrated) that are monitoring the external status of the one or more machines 1321 by collecting sound data as described herein.

Figure 14:
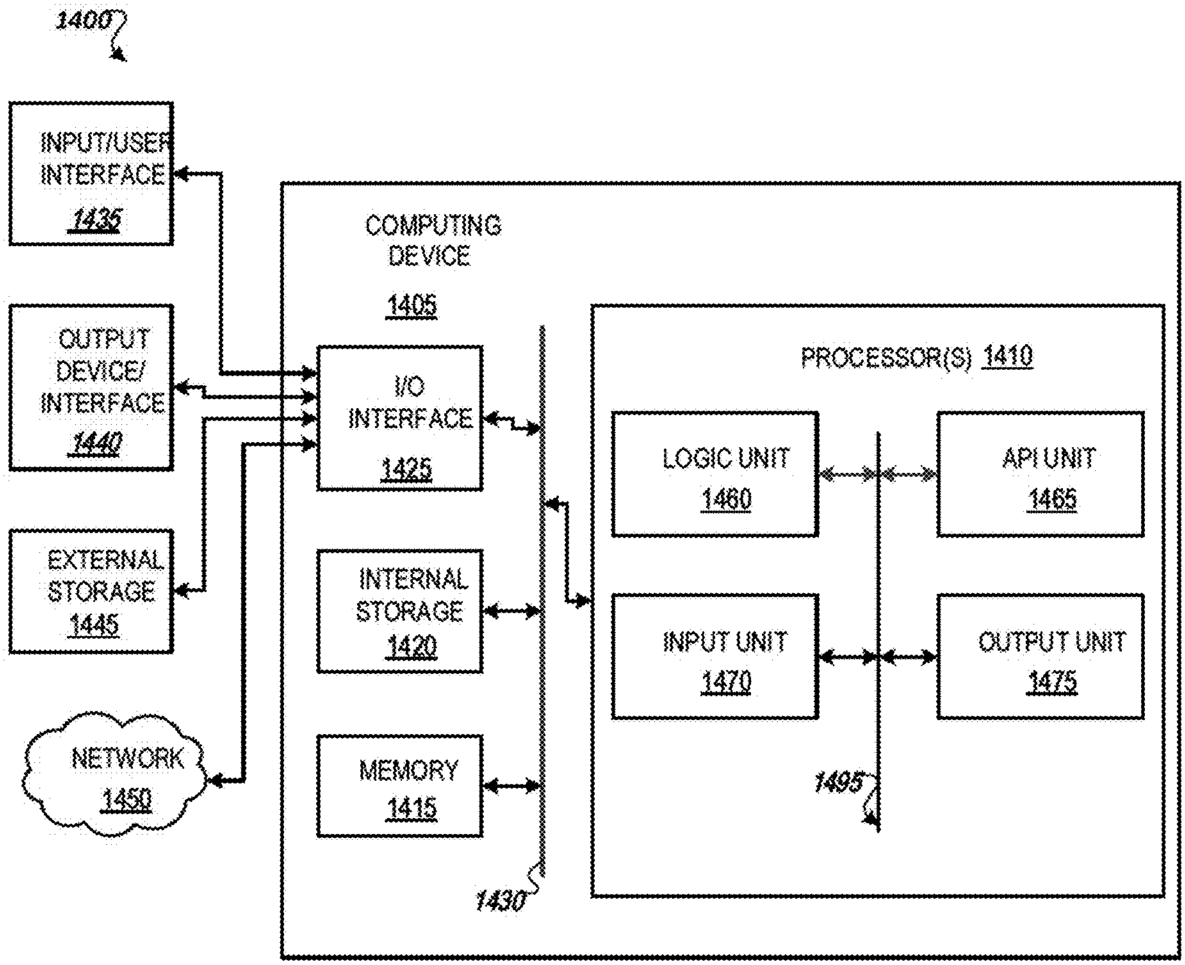
FIG. 14 illustrates an example computing environment with an example computer device suitable for use in some example implementations.

FIG. 14 illustrates an example computing environment with an example computer device suitable for use in some example implementations, such as the management apparatus 1322 to facilitate the functionality of each robot. Computer device 1405 in computing environment 1400 can include one or more processing units, cores, or processors 1410, memory 1415 (e.g., RAM, ROM, and/or the like), internal storage 1420 (e.g., magnetic, optical, solid state storage, and/or organic), and/or I/O interface 1425, any of which can be coupled on a communication mechanism or bus 1430 for communicating information or embedded in the computer device 1405. I/O interface 1425 is also configured to receive images from cameras or provide images to projectors or displays, depending on the desired implementation.

Computer device 1405 can be communicatively coupled to input/user interface 1435 and output device/interface 1440. Either one or both of input/user interface 1435 and output device/interface 1440 can be a wired or wireless interface and can be detachable. Input/user interface 1435 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1440 may include a display, television, monitor, printer, speaker, braille, or the like. In some example implementations, input/user interface 1435 and output device/interface 1440 can be embedded with or physically coupled to the computer device 1405. In other example implementations, other computer devices may function as or provide the functions of input/user interface 1435 and output device/interface 1440 for a computer device 1405.

Examples of computer device 1405 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1405 can be communicatively coupled (e.g., via I/O interface 1425) to external storage 1445 and network 1450 for communicating with any number of networked components, devices, and systems, including one or more computer devices of the same or different configuration. Computer device 1405 or any connected computer device can be functioning as, providing services of, or referred to as a server, client, thin server, general machine, special-purpose machine, or another label.

I/O interface 1425 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1400. Network 1450 can be any network or combination of networks (e.g., the Internet, local area network, wide area network, a telephonic network, a cellular network, satellite network, and the like).

Computer device 1405 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1405 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1410 can execute under any operating system (OS) (not shown), in a native or virtual environment. One or more applications can be deployed that include logic unit 1460, application programming interface (API) unit 1465, input unit 1470, output unit 1475, and inter-unit communication mechanism 1495 for the different units to communicate with each other, with the OS, and with other applications (not shown). The described units and elements can be varied in design, function, configuration, or implementation and are not limited to the descriptions provided. Processor(s) 1410 can be in the form of hardware processors such as central processing units (CPUs) or in a combination of hardware and software units.

In some example implementations, when information or an execution instruction is received by API unit 1465, it may be communicated to one or more other units (e.g., logic unit 1460, input unit 1470, output unit 1475). In some instances, logic unit 1460 may be configured to control the information flow among the units and direct the services provided by API unit 1465, input unit 1470, output unit 1475, in some example implementations described above. For example, the flow of one or more processes or implementations may be controlled by logic unit 1460 alone or in conjunction with API unit 1465. The input unit 1470 may be configured to obtain input for the calculations described in the example implementations, and the output unit 1475 may be configured to provide output based on the calculations described in example implementations.

Memory 1415 can be configured to store collected sound data from at least one sound collection device as disclosed in the environment of FIG. 13. The stored collected sound data can be converted from analog sound data to digital sound data by an analog to digital converter (not illustrated).

Processor(s) 1410 can be configured to execute a method or computer instructions including extracting human sound data 320 from the digital sound data; extracting environmental sound data 321 from the digital sound data; executing word detection 103 on the human sound data 320; executing emotion analysis 104 from the extracted human sound data 320; and for analysis of the word detection and the emotion analysis indicative of an emergency (800 to 802 of FIG. 8), controlling one or more associated machines in the manufacturing environment in response to the emergency (FIG. 9), wherein a location of the one or more associated machines is derived from the environmental sound data (FIG. 7).

Processor(s) 1410 can be configured to execute the method or instructions as described above, and further involve identifying workers from the human sound data 320 based on a work schedule (e.g., metadata 610), timestamps 322 applied to the human sound data 320, and one or more worker profiles (e.g., from database 602) constructed from execution of a neural network on previously collected human sound data.

Processor(s) 1410 can be configured to execute the method or instructions as described above, and further involve identifying ones of the workers currently in danger based on a location radius derived from sound intensities of the one or more associated machines as described with respect to FIG. 7.

Processor(s) 1410 can be configured to execute the method or instructions as described above, and further involve sending notifications to the identified ones of the workers currently in danger as described with respect to FIG. 7 and FIG. 9.

Processor(s) 1410 can be configured to execute the method or instructions as described above, and further involve applying timestamps to the environmental sound data and the human sound data based on data collection time from the at least one sound collection device as shown at 305 and 322 of FIG. 3.

Processor(s) 1410 can be configured to execute the method or instructions as described above, wherein the executing the emotion analysis is conducted by an emotion classifier constructed from a neural network trained against a dataset of sounds and corresponding emotions as illustrated in FIG. 5.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as “processing,” “computing,” “calculating,” “determining,” “displaying,” or the like, can include the actions and processes of a computer system or other information processing device that manipulates and transforms data represented as physical (electronic) quantities within the computer system’s registers and memories into other data similarly represented as physical quantities within the computer system’s memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A system for a manufacturing environment, comprising:

at least one sound collection device;

a memory, configured to store collected sound data from the at least one sound collection device;

an analog to digital converter configured to convert the stored collected sound data from analog sound data to digital sound data; and a processor, configured to:

extract human sound data from the digital sound data;

extract environmental sound data from the digital sound data;

execute word detection on the human sound data;

execute emotion analysis from the extracted human sound data; and for analysis of the word detection and the emotion analysis indicative of an emergency:

control one or more associated machines in the manufacturing environment in response to the emergency, wherein a location of the one or more associated machines is derived from the environmental sound data by comparing sound intensities received by multiple machines to identify an intersection of location radii indicating a source of the emergency.

2. The system of claim 1, wherein the processor is further configured to:

identify workers from the human sound data based on a work schedule, timestamps applied to the human sound data, and one or more worker profiles constructed from execution of a neural network on previously collected human sound data.

3. The system of claim 2, wherein the processor is further configured to identify ones of the workers currently in danger based on a location radius derived from sound intensities of the one or more associated machines.

4. The system of claim 3, wherein the processor is further configured to send notifications to the identified ones of the workers currently in danger.

5. The system of claim 1, wherein the processor is further configured to:

apply timestamps to the environmental sound data and the human sound data based on data collection time from the at least one sound collection device.

6. The system of claim 1, wherein the execution of the emotion analysis is conducted by an emotion classifier constructed from a neural network trained against a dataset of sounds and corresponding emotions.

7. The system of claim 1, wherein the processor is further configured to:

when a confidence in an emergency judgment is below a threshold, execute an emergency verification model to validate whether a real emergency exists and trigger additional sound collection for re-analysis.

8. The system of claim 1, wherein the extraction of the human sound data and the extraction of the environmental sound data are performed by separate neural networks trained offline for detecting human sound and environmental sound, respectively.

9. A method for a manufacturing environment, comprising:

storing collected sound data from at least one sound collection device;

converting the stored collected sound data from analog sound data to digital sound data;

extracting human sound data from the digital sound data;

extracting environmental sound data from the digital sound data;

executing word detection on the human sound data;

executing emotion analysis from the extracted human sound data; and for analysis of the word detection and the emotion analysis indicative of an emergency:

controlling one or more associated machines in the manufacturing environment in response to the emergency, wherein a location of the one or more associated machines is derived from the environmental sound data by comparing sound intensities received by multiple machines to identify an intersection of location radii indicating a source of the emergency.

10. The method of claim 9, further comprising:

identifying workers from the human sound data based on a work schedule, timestamps applied to the human sound data, and one or more worker profiles constructed from execution of a neural network on previously collected human sound data.

11. The method of claim 10, further comprising identifying ones of the workers currently in danger based on a location radius derived from sound intensities of the one or more associated machines.

12. The method of claim 11, further comprising sending notifications to the identified ones of the workers currently in danger.

13. The method of claim 9, further comprising applying timestamps to the environmental sound data and the human sound data based on data collection time from the at least one sound collection device.

14. The method of claim 9, wherein the executing the emotion analysis is conducted by an emotion classifier constructed from a neural network trained against a dataset of sounds and corresponding emotions.

15. A non-transitory computer readable medium, storing instructions for a manufacturing environment, comprising:
- storing collected sound data from at least one sound collection device;
- converting the stored collected sound data from analog sound data to digital sound data;
- extracting human sound data from the digital sound data;
- extracting environmental sound data from the digital sound data;
- executing word detection on the human sound data;
- executing emotion analysis from the extracted human sound data; and
  - for analysis of the word detection and the emotion analysis indicative of an emergency:
    - controlling one or more associated machines in the manufacturing environment in response to the emergency, wherein a location of the one or more associated machines is derived from the environmental sound data by comparing sound intensities received by multiple machines to identify an intersection of location radii indicating a source of the emergency.

16. The non-transitory computer readable medium of claim 15, the instructions further comprising:
- identifying workers from the human sound data based on a work schedule, timestamps applied to the human sound data, and one or more worker profiles constructed from execution of a neural network on previously collected human sound data.

17. The non-transitory computer readable medium of claim 16, the instructions further comprising identifying ones of the workers currently in danger based on a location radius derived from sound intensities of the one or more associated machines.

18. The non-transitory computer readable medium of claim 17, the instructions further comprising sending notifications to the identified ones of the workers currently in danger.

19. The non-transitory computer readable medium of claim 15, the instructions further comprising applying timestamps to the environmental sound data and the human sound data based on data collection time from the at least one sound collection device.

20. The non-transitory computer readable medium of claim 15, the instructions wherein the executing the emotion analysis is conducted by an emotion classifier constructed from a neural network trained against a dataset of sounds and corresponding emotions.

* * * * *